(No Model.)
M. DEUTSCH.
DENTAL FLOSS HOLDER.
No. 538,662. Patented May 7, 1895.
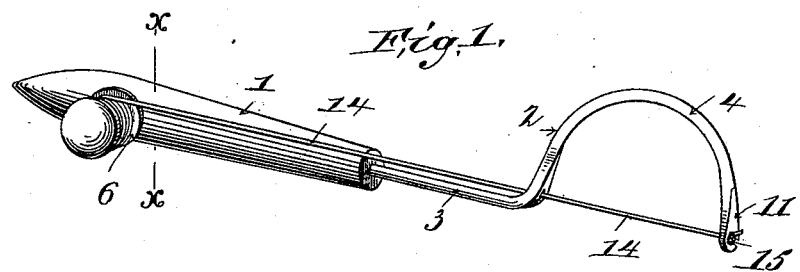
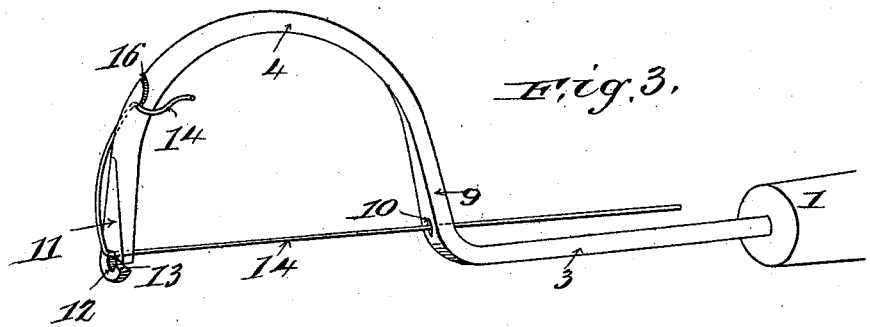
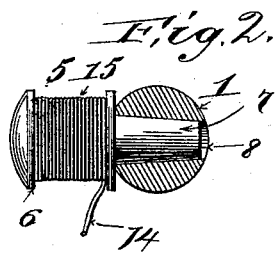
WITNESSES:
C. W. Benjamin
Wm. Jacobsen
INVENTOR
Michael Deutsch,
BY Joseph L. Levy
ATTORNEY

UNITED STATES PATENT OFFICE.

MICHAEL DEUTSCH, OF NEW YORK, N. Y.

DENTAL-FLOSS HOLDER.

SPECIFICATION forming part of Letters Patent No. 538,662, dated May 7, 1895.

Application filed July 5, 1894. Serial No. 516,543. (No model.)

*To all whom it may concern:*

Be it known that I, MICHAEL DEUTSCH, a citizen of the United States, residing in the city, county, and State of New York, have made certain new and useful Improvements in Dental-Floss Holders, of which the following is a specification.

My invention relates to devices for carrying dental floss, and it consists in the combination with a straight shank terminating in a bow portion having eyes therein, of a handle secured thereto, and a spool secured to the handle, so as to be readily wound or unwound, attached or detached and locked in position in the handle.

The construction of the bow in my invention presents only a very small amount of the structure to be inserted in the mouth, enabling the thread or floss to be passed between the rearmost teeth without discomfort. My construction also enables me to use the floss to be readily destroyed and a new portion presented for use, and also embraces means whereby an entire new supply of floss can be readily secured to the device.

My invention therefore consists in the combination of parts hereinafter described and further pointed out in the claim.

In the drawings forming part of this specification, Figure 1 is a perspective view of a device embodying my invention slightly enlarged. Fig. 2 is a sectional elevation on the line $x$ $x$, Fig. 1, further enlarged; and Fig. 3 is a perspective view of the bow and a portion of the handle, showing a slight modification.

In the drawings 1 indicates the handle of any desired form and material, and 2 the bow, which comprises the shank 3 and the bow portion 4, which portion will be hereinafter termed the bow. The bow may be elliptic in form as shown, circular or have any other desired conformation, the reason for which will be apparent.

At 5 is shown the spool which comprises the reel portion 6 and a tapering stud 7 which enters a tapered aperture 8, passing diametrically through the handle 1, as seen in Fig. 2. The reel portion of the spool affords means for readily winding on the dental floss, and the same can be sold by the silk manufacturer with the floss wound thereon ready to be attached to the handle and threaded as hereinafter set forth, or the floss can be purchased separate from the device and wound thereon if desired. The tapered stud and aperture afford ready means for locking the spool in position and preventing its further unwinding. It is simple in form and not complicated with other elements, such as a receptacle to hold a spool, which has to be removed before the spool can be put in place and is located at a considerable distance from the bow, so that the non-operative or non-exposed portion of the floss will not be soiled by coming in contact with the saliva of the mouth, and the amount of floss on the spool is always apparent without having to remove a covering or the like to ascertain whether the supply is exhausted or not.

One of the most essential parts of my invention resides in offering two points of resistance to lateral or other displacement of the floss while being used, which points are contained within narrow limits, so that absolute perfection in operation can be had. To secure this I widen the bow at its inner end near its point of union with the shank, as at 9, and provide such widened portion with a hole 10. This widened portion is not essential but it assists in the manufacture of the article, the bow and shank being made of one piece of wire, and where widened or flattened, as before set forth, is more readily bent in shape at that point. The forward part of the bow is also preferably flattened out, as at 11, and provided with an aperture 12 (see Fig. 3) and a slot 13 opening out from the aperture or hole 12. The floss 14 on the spool is unwound and passed first through the hole 10 and then through the slot 13 into the hole 12, where it can be secured in place, either by tying a knot on the end, as shown at 15, Fig. 1, or the bow 4 can be provided with a contracted slit, as 16, Fig. 3, through which the end of the floss 14 can be passed and thus secure it at that end, through which threading the locking means, comprising the conical stud 7 and conical aperture 8, having been released or freed, and after the forward end is secured reversely wound and forced home to secure the spool from further turning and giving the flax its proper tension.

It is apparent that many changes and modifications can be made in the structure heretofore described without departing from the spirit of my invention.

I claim—

In an article of the class described, the combination of a handle, a straight shank secured thereto having a bow portion at the end provided with eyes, a thread-winding device extending from the surface of the handle, and thread passed through said eyes and along said shank to said winding device, substantially as described.

MICHAEL DEUTSCH.

Witnesses:
B. S. WISE,
WM. JACOBSEN.